(12) United States Patent
Will et al.

(10) Patent No.: US 6,688,435 B1
(45) Date of Patent: Feb. 10, 2004

(54) ELECTRONIC ORDERING OF GOODS WITH DELIVERY BY AUTOMATIC DRIVE-UP STORAGE DEVICE

(76) Inventors: Craig Alexander Will, P.O. Box 713, Mi Wuk Village, CA (US) 95346; Michael Stephen Will, 2506 La Golondrina St., Carlsbad, CA (US) 92009

( * ) Notice: Subject to any disclaimer, the term of this patent is extended or adjusted under 35 U.S.C. 154(b) by 196 days.

(21) Appl. No.: 09/999,752

(22) Filed: Oct. 31, 2001

Related U.S. Application Data

(60) Provisional application No. 60/245,424, filed on Nov. 1, 2000, provisional application No. 60/245,425, filed on Nov. 1, 2000, provisional application No. 60/245,426, filed on Nov. 1, 2000, and provisional application No. 60/245,427, filed on Nov. 1, 2000.

(51) Int. Cl.⁷ .............................. A47B 8/00; B61B 3/00; B61D 3/00; B65G 47/00; B04H 3/00
(52) U.S. Cl. ........................... 186/35; 186/55; 700/242; 705/26
(58) Field of Search ...................... 186/35, 55; 414/268, 414/807; 700/214, 215, 216, 231, 232, 237, 242; 705/26

(56) References Cited

U.S. PATENT DOCUMENTS

| | | | |
|---|---|---|---|
| 3,741,345 A | * | 6/1973 | Saridis .................. 186/55 |
| 4,416,413 A | | 11/1983 | Chester |
| 4,494,805 A | | 1/1985 | Washburn |
| 4,734,858 A | | 3/1988 | Schlafly |
| 4,865,248 A | | 9/1989 | Barth |
| 4,874,281 A | * | 10/1989 | Bergerioux et al. ......... 414/285 |
| 5,039,179 A | | 8/1991 | Chouzenoux |
| 5,062,151 A | | 10/1991 | Shipley |
| 5,158,155 A | * | 10/1992 | Domain et al. .............. 186/53 |
| 5,244,339 A | | 9/1993 | Normand |
| 5,293,160 A | | 3/1994 | Kurozu et al. |
| 5,496,003 A | | 3/1996 | Bernard |
| 5,532,521 A | | 7/1996 | Leininger |
| 5,704,017 A | | 12/1997 | Heckerman et al. |
| 5,774,053 A | | 6/1998 | Porter |
| 5,850,967 A | | 12/1998 | White |
| 6,116,506 A | | 9/2000 | Matsumoto et al. |
| 6,323,782 B1 | * | 11/2001 | Stephens et al. .......... 340/10.31 |
| 6,535,790 B2 | * | 3/2003 | Nakano et al. ............. 700/214 |
| 6,578,671 B2 | * | 6/2003 | Shen .......................... 186/53 |

OTHER PUBLICATIONS

Caruso, Denise. Digital Commerce: On–Line Sellers Learn How to Get Packages From Cyberspace to Consumers. New York Times, Mar. 30, 1998, p C5.

* cited by examiner

Primary Examiner—Donald P. Walsh
Assistant Examiner—Kenneth Bower

(57) ABSTRACT

A method and apparatus for the order and delivery of goods in which the goods are transported to one or more storage containers that are maintained in a drive-up storage, retrieval, and dispensing mechanism. Goods are ordered via the Internet, telephone, or other electronic method, retrieved from a warehouse or store, and transported to the storage container by truck or by a regional train system designed for passenger use. The storage container accepts packages, which are placed into a plastic storage box and moved by an elevator assembly to a particular storage bin located in a matrix of bins arranged in columns and rows. When a customer arrives to pick up a package, he or she drives up to the device and communicates with the system via a keypad and display screen to identify the order and present appropriate identification of the person or other means of maintaining security. A computer verifies the identification and retrieves the storage box, presenting it to the window of the vehicle driving up at an appropriate height so that the customer can retrieve the package. The use of a handheld wireless device by the customer can aid in ordering, checking order status, obtaining directions, providing identification, and retrieving the order.

20 Claims, 9 Drawing Sheets

ELECTRONIC ORDERING OF GOODS WITH DELIVERY BY AUTOMATIC DRIVE-UP STORAGE DEVICE

CROSS-REFERENCE TO RELATED APPLICATIONS

The present application is related to U.S. provisional applications Nos. 60/245,424, 60/245,425, 60/245,426, and 60/245,427, all filed Nov. 1, 2000, and to U.S. patent application Ser. No. 09/288,683, filed Apr. 9, 1999, titled "System for Purchase and Delivery of Goods via Internet." All of these applications are incorporated by reference into the present application.

FIELD OF THE INVENTION

The invention disclosed here is related generally to systems for electronic commerce in which delivery of goods is made to a storage device and later picked up by the customer. More specifically, the invention relates to an electronic commerce system in which delivery of goods is made to an automatic drive-up storage device, and to the use of handheld devices that aid in placing, modifying, checking the status of, and picking up orders for such goods.

BACKGROUND OF THE INVENTION

A significant problem with the electronic commerce system such as practiced using the Internet and World Wide Web is the difficulty in economically delivering physical goods that have been ordered. A variety of approaches have been tried in an attempt to solve this problem. While the use of traditional delivery services such as United Parcel Service and Federal Express have been common, their use has resulted in limited success. One major problem is that in the present world in which most members of a household work during the day, people are often not home to receive an order. This is a nuisance for the customer and, because of the need for redelivery (or running the risk of leaving a package on a doorstep, risking theft), significantly increases costs for the delivery service. A second problem is that except in certain very dense metropolitan areas (Manhattan, to a lesser extent San Francisco), the density of deliveries is such that it is time-consuming and costly to deliver to residential, as opposed to business, customers. Webvan, a specialized Web delivery service, allowed users make use of the Web to not only place orders but to schedule deliveries within a tight window of time, which reduced the "customer not home" problem. However, Webvan, even with highly automated warehouse operations to reduce costs, could still not solve the cost problems and has now ceased operations.

Another solution that has been tried is the use of a locker owned or rented by the customer installed at their premises. However, this is costly and still does not address the problem of low density of deliveries. What is needed is an approach that can address this latter cost problem.

SUMMARY OF THE INVENTION

The goal of the invention disclosed here is to provide a method and apparatus for the order and delivery of goods in which the goods are transported to one or more storage containers that are maintained in a drive-up storage, retrieval, and dispensing mechanism. Goods are ordered via the Internet, telephone, or other electronic method, retrieved from a warehouse or store, and transported to the storage container typically by truck or by a regional train system designed for passenger use.

The drive-up storage device is typically installed in or near a parking lot or similar area, and particularly near a station of a train system. The storage container accepts packages, which are placed into a plastic storage box and moved by an elevator assembly to a particular storage-bin located in a matrix of bins arranged in columns and rows.

When a customer arrives to pick up a package, he or she drives up to the device and communicates with the system via a keypad and display screen to identify the order and present appropriate identification of the person or other means of maintaining security. A computer verifies the identification and retrieves the storage box, presenting it, if the package is of an appropriate size and weight, to the window of the vehicle driving up at an appropriate height so that the customer can retrieve the package. If the package is too large or heavy for delivery in this manner, the customer is asked to move his vehicle so that the package can be delivered to the customer on foot for placement in the vehicle.

This invention is particularly suitable for use by an individual who makes use of a wireless handheld communications device to aid in the order and delivery coordination. With such a device, a customer can not only place an order, but can negotiate for the best location for delivery, can check the status of the order (when is it expected to be delivered, has it been delivered?), perhaps even being paged when the order is ready. The device might also allow modification of the order, should the store be out of stock or if the customer has further thoughts about the desired order. In addition, the device can provide the user with directions for how to find the delivery location. Finally, the device can help the customer easily pick up the order, by indicating to the system that the customer has arrived and, in a secure fashion, is in fact the person legitimately allowed to pick up the order. Finally, the device can help the customer retrieve the order by determining whether it is appropriate to simply obtain it from a window dispensing station through the open window of a car door (adjusting the height of the dispensing window if necessary) or whether the order is sufficiently heavy that it is better picked up by hand and then loaded into the vehicle.

BRIEF DESCRIPTION OF THE DRAWINGS

FIG. 2A shows an overall illustration of the drive-up storage container.

FIG. 2B shows an illustration of a system for insuring that the package is presented to the driver of the vehicle at the appropriate height.

FIG. 4A shows a front view of the storage bins.

FIG. 4B shows a top view of the storage bins and elevator assembly.

FIG. 5A shows a front-top-right perspective view of a storage box.

FIG. 5B shows a front view of the storage box shown in FIG. 5A.

DETAILED DESCRIPTION OF THE INVENTION

Figure 1:
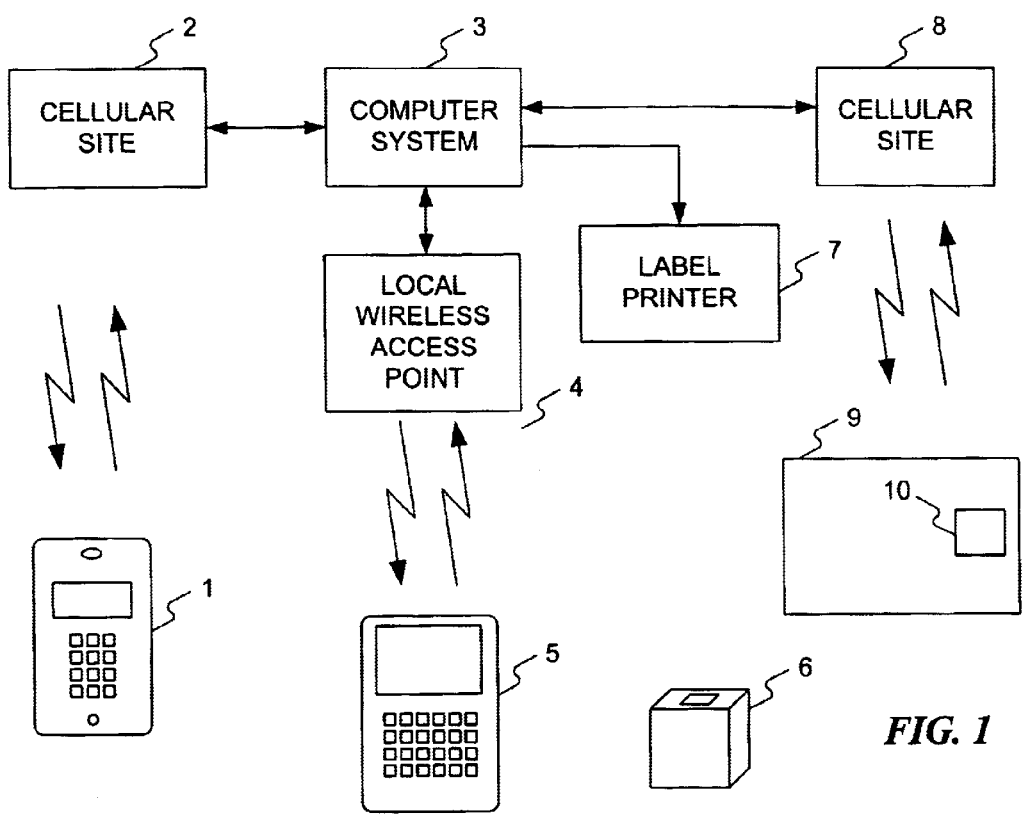
FIG. 1 shows an overall diagram of the system for electronic ordering of goods with delivery by automatic drive-up storage device.

FIG. 1 shows an overall diagram of the system for electronic ordering of goods with delivery by automatic drive-up storage device.

Wireless access device 1, such as a cellular telephone, connects through wireless cellular site 2 to computer system 3, which contains an inventory of goods to be sold and allows the user to navigate through the inventory and place an order. Computer system 3 connects in turn through local wireless access point 4 to wireless personal digital assistant 5, which indicates to a warehouse clerk what has been ordered. The clerk locates the goods, places the goods in a package 6, prints out a label for the package using label printer 7, and forwards the package by appropriate means to storage locker 9. The fact of the completion of the order is transmitted to computer system 3. Storage locker 9 communicates through cellular site 8 to computer system 3 to receive notice to expect the package, to report when the package has arrived, and to indicate when the package has been picked up. In addition, the user, using wireless access device 1, may indicate where the delivery is to take place, receive directions concerning how to find storage locker 9, indicate when he or she has arrived at the vicinity of locker 9, and communicate, via cellular site 2, computer system 3, and cellular site 8, with storage locker 9 concerning the dispensing of the package. This may include identifying the user appropriately, raising or lowering the height of the window for dispensing the package 10, opening or closing the window for dispensing the package 10, and requesting that the package be dispensed.

The transport of the package to the storage locker may be done on foot, particularly if the locker is on the premises of a retail store that stocks goods. Such a locker may be a stand-alone structure in the parking lot of the store, or may be designed to be contained in the store such that the dispensing window 10 appears at the outside wall of the store to facilitate drivers driving a vehicle past the store and so picking up goods, and allowing delivery of goods to the storage locker from inside the store.

Transport may also be done, for part or all of the journey, by hand truck, powered truck or other vehicle, or by use of a regional train system designed primarily for passenger use. In the case of such a train system the placement of the storage locker in or near the parking lot or passenger pick-up point of one of the stations of such a train system is particularly advantageous.

Details of ordering, selection of delivery points, tracking of packages, and the like in the case of a truck or a regional passenger train system may be found in the regular U.S. patent application Ser. No. 09/288,683, filed Apr. 9, 1999 by Craig A. Will, entitled "System for purchase and delivery of goods via Internet" that is incorporated by reference into the present application.

In placing an order, a customer uses the Web browser on PC or wireless device to communicate with store web server to get information to help decide what to order, place the order, and arrange for payment. The customer then communicates with delivery server to negotiate the details of delivery, including specifying a delivery location and a locker for the goods to be placed in. Typically, the customer's first choice for location will be honored, but if no locker is available at the time of order the customer can pick a different location or can defer a decision until later.

At a later time the customer can log onto a delivery (Web) server, either from personal computer, a different personal computer, or wireless device, and verify that the order has been successfully filled and is on its way (or waiting for the customer to choose a location). The customer will typically also access the delivery server to determine that the order has in fact been placed in the locker. (Alternatively, the system can send an electronic mail message to the customer, retrievable by PC, cellular telephone, two-way pager, etc, or the system can send a short text message received by the customer's cellular telephone, two-way pager, or wireless PDA.) The customer then proceeds to the delivery location. When the customer approaches the delivery location and logs onto the delivery server, the location of the portable (typically handheld) wireless device (and thus the customer) is determined. This determination can be made by a GPS receiver contained in the device, using any of a number of methods that are well known in the art. Alternatively, the determination can be made on the basis of signal strength as received from the portable device transmitter at one or more cell sites, signal strength of the cell site transmitter at the portable device, or both, since the resolution required is relatively coarse to determine what station the customer is at or near.

When the customer logs onto the delivery server and is found to be near a particular delivery location, the delivery server determines the status of the order. If the customer is at a different location than where the order was delivered, the customer is so notified.

There are two reasons for using a handheld device to open the locker: (1) convenience; and (2) security. The approach is convenient because it is easier to just press a button to open the locker rather than keying in a password. Convenience (via the sense of continuity) is also enhanced by the continuity of checking the status of an order, or placing the order, with the same device that is used to obtain the order at the delivery location. Security is enhanced because of the necessity to have a particular physical device to open the locker rather than just a password, the latter of which can be far more easily stolen, in bulk.

The security enhancement resulting from the handheld device can occur in several ways. An identification code is contained in the handheld device, which may be in a permanent memory such as jumpers or in a read-only memory. Alternatively, it may be encoded in a semipermanent memory such as flash memory. Transmission of the code is encrypted to prevent interception of and cloning of a different device with the same code, with the use of a Secure Sockets Layer, or its successor, a Transport Security Layer, used for both encryption and to prevent interception by, for example, having a computer pose as a delivery server.

Security precautions include not only encryption but the use of digital certificates to insure that information, such as from an activity recorder, is not being passed to some impostor process. The Transport Layer Security protocol is the preferred technique for this, and is defined in Internet Engineering Task Force (IETF) document RFC 2246, "The TLS Protocol Version 1.0", by T. Dierks and C. Allen, final version dated January, 1999. This document is available at http://wwvvw.ietf.org. The Secure Sockets Layer (SSL) protocol, a precursor version of TLS, could also be used for implementation. SSL was developed by Netscape Corporation and is described in U.S. Pat. No. 5,657,390 to Elgamal and Hickman. TLS and SSL are also described in the book *SSL and TLS Essentials: Securing the Web*, by Stephen Thomas (New York: Wiley Computer Publishing, John Wiley & Sons, Inc., 2000).

In the following, several alternative embodiments will be described. To the extent that different embodiments reflect different levels of security, the choice of a particular embodiment may be made for a system as a whole, on the basis of a customer's preference, or on the basis of the value of a particular order. In one embodiment, one or more handheld devices (as designated by their identification codes) are associated with a particular account, and orders placed using that account must normally be picked up using one of the devices. (There will also be an alternative way of picking up the order without a device, by going to a station and presenting an ID card and being recorded on video, in case the customer forgets to bring the device.)

In a second embodiment, a particular handheld device is designated (perhaps selected from one or more already associated with the account used) to allow a particular order to be picked up.

Figure 2A:
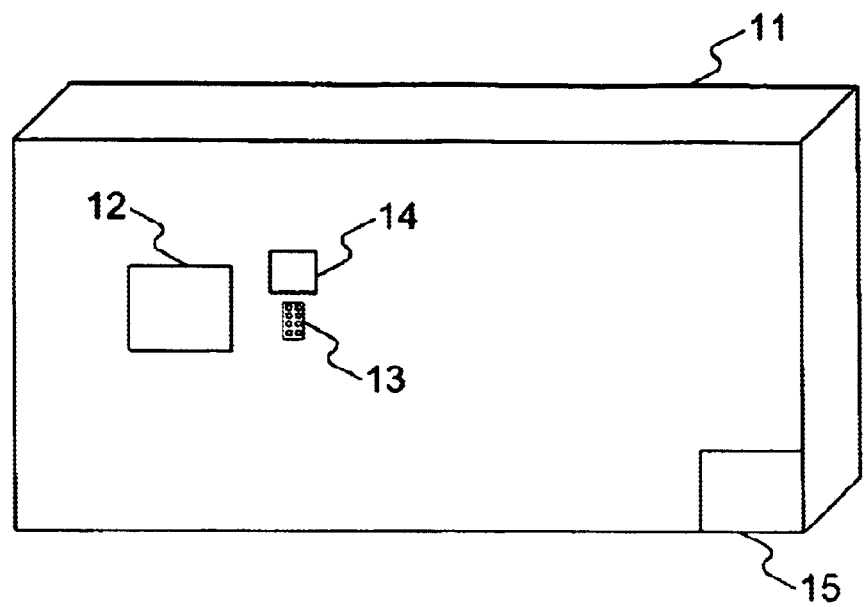
FIGS. 2A and 2B show an illustration of the drive-up storage container and pickup mechanism that is part of the electronic ordering and delivery system.
Figure 2B:
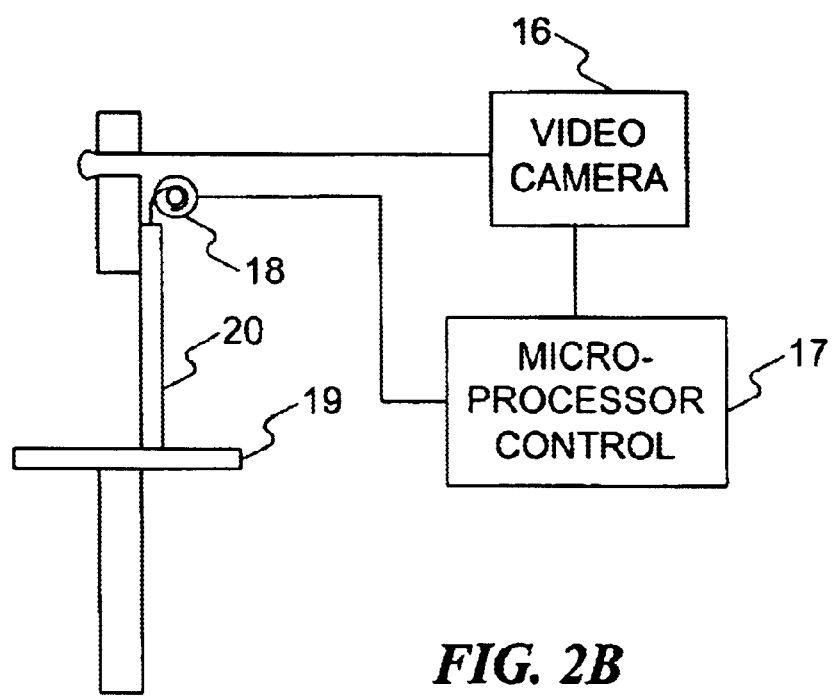

FIGS. 2A and 2B show an illustration of the drive-up storage container and pickup mechanism that is part of the electronic ordering and delivery system.

FIG. 2A shows an overall illustration of the drive-up storage container.

A structure 11 is constructed of metal, plastic, wood, or similar materials at a convenient location. In particular, the location is typically a parking lot, especially a parking lot or driveway or similar access area at a regional train system designed for passenger use.

The structure has a delivery window 12 built into it that may be fixed but is preferably a sliding window that works in conjunction with an elevator, described below.

Also associated with the delivery window is a keypad 13 and display screen 14. The customer drives up to the mechanism, identifies him or herself (such as by typing an order number and/or password) via the keypad, and interacts with the display screen to retrieve the order that has been placed. (In an alternative, described later in this application, the user makes use of a handheld device, such as a cellular telephone, to perform such interaction).

A computer system contained in the structure communicates with a central server at the delivery system and determines the size and weight of the package to be delivered. If it is a size and weight that can be delivered through a car window, the customer is told, via the display screen, that the delivery will be made at the delivery window #1 12 and the package is retrieved as described below and delivered through the window. If the package is larger and/or heavier that can reasonably be delivered through a car window, the customer is so notified through the display screen and asked to drive their car to a predetermined mark ahead ("Please drive ahead to the green sign") such that the driver can easily get out of the car door and can retrieve the package from the delivery window and place it in the trunk (if desired) of the vehicle. In this case the package is delivered via delivery window #2 15. Alternatively, the first delivery window 12 may be used but with the window lowered to ground level.

Note that the ordering may be over the Internet via a web browser on a personal computer, personal digital assistant (including wireless), two-way pager with the most minimal "browser" or no browser, or cellular telephone. Ordering may also be accomplished by telephone using voice or if the customer visits a store and needs to order goods that they do not have in stock.

The drive-up station may be on the premises of a delivery system such as a regional train system designed primarily for passenger use, at an airport or bus station or truck station, or it may be on the premises of a retail store, either in the parking lot or near or connected to the physical structure of the store or even integrated into the store so that persons within the store can load goods into the device while customers driving up outside can retrieve the goods via a drive-up window.

FIG. 2B shows an illustration of a system for insuring that the package is presented to the driver of the vehicle at the appropriate height. A camera 16 accepts an image of the vehicle and digitizes it and presents it to a microprocessor controller 17, where pattern recognition software determines the height of the bottom of the window and causes electric motor 18 to move up or down a platform 19 containing a window 20, plus typically a platform for the box containing the package to rest on, so that it is an appropriate height given the height of the bottom of the window (and optionally also considering the height of the window itself). The system also controls, although not shown, the height of the elevator assembly that is described below that delivers the box. The camera may be a still camera or a video camera, the latter taking multiple images as the vehicle drives up and uses the context of the multiple images to aid in determining the appropriate height for the window and platform. The system may also determine whether the driver's window is open or closed and, if closed, present a request on the display screen (or spoken request from recorded audio or speech synthesis) for the driver to open the window. Note that this same camera can also be used (especially by zooming in and out and panning) for other purposes, including improving security and biometric identification. Alternatively, the user may control the height of the window by means of the keypad and display screen shown in FIG. 2A, or using a handheld wireless device. In addition, a combination may be used, as in the case where the system attempts to set automatically the height of the window and platform but does not do it correctly and the user must override.

Figure 3:
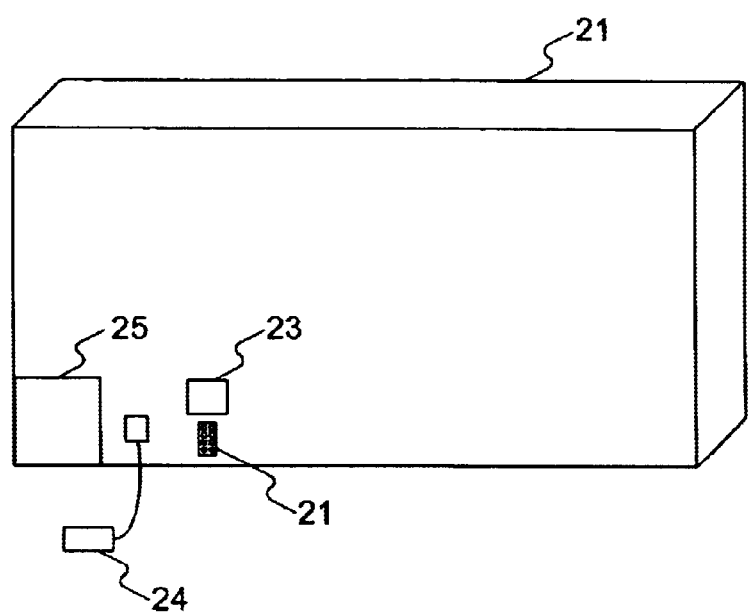
FIG. 3 shows an illustration of the drive-up storage container and pickup mechanism that is part of the electronic ordering and delivery system that shows particularly a rear portion of the mechanism that is used for accepting packages that have been delivered.

FIG. 3 shows an illustration of the drive-up storage container and pickup mechanism that is part of the electronic ordering and delivery system that shows particularly a rear portion of the mechanism that is used for accepting packages that have been delivered.

The drive-up storage container 21 contains a keypad 22 and display screen 23 (or other identification mechanism such as card reader and/or biometric identification mechanism) that allows a delivery employee to identify his or herself to gain access to the device. When so identified, the delivery employee uses a bar code scanner 24 (or other reader of an identification code associated with the package) to identify the package. The acceptance window 25 then opens and the employee then either slides in a storage box (see below) or places the package into an existing empty storage box that the system has provided near the delivery window. Once the package has been accepted the delivery window closes.

Figure 4A:
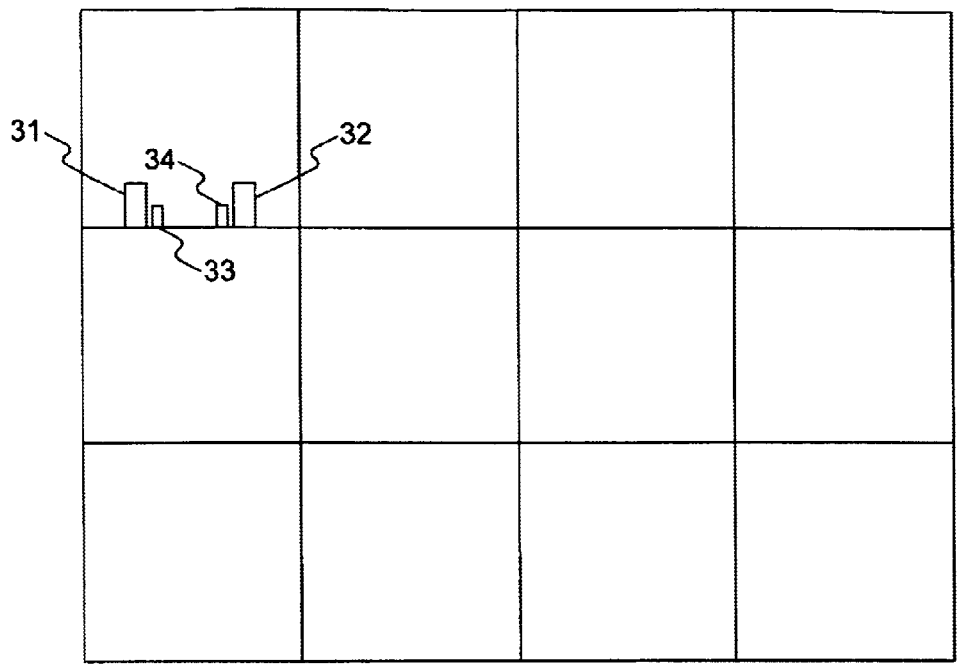
FIGS. 4A and 4B show illustrations of the storage bins for the drive-up storage container and pickup mechanism that is part of the electronic ordering and delivery system.
Figure 4B:
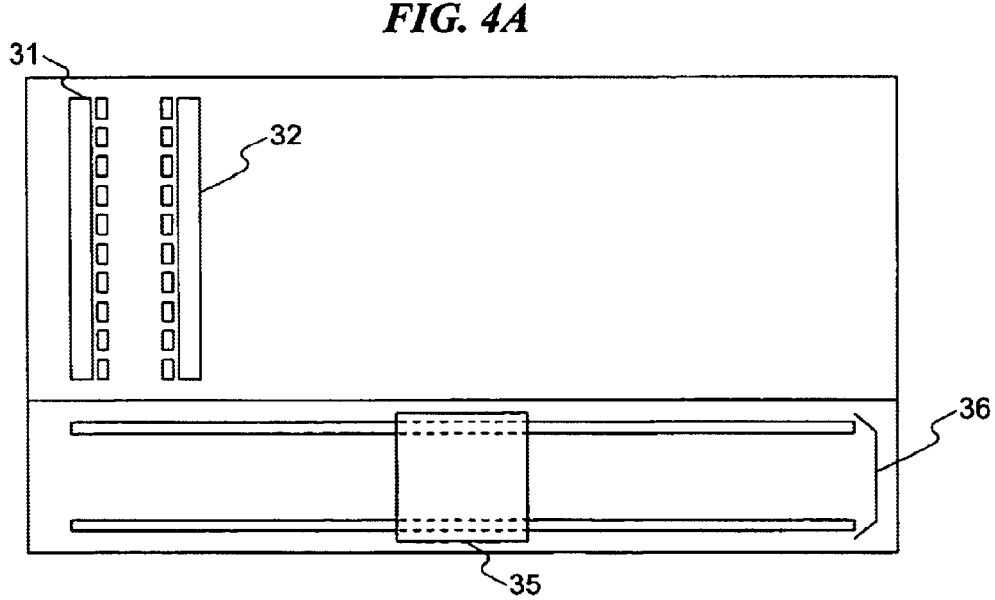

FIGS. 4A and 4B show illustrations of the storage bins for the drive-up storage container and pickup mechanism that is part of the electronic ordering and delivery system.

FIG. 4A shows a front view of the storage bins. This is from the point of view of the customer (who can't actually see them) and, more productively, from the view of the elevator apparatus that retrieves items from the storage bins. Bins are arranged in a horizontal and vertical matrix. Each bin has side rails 31 and 32 that act as tracks that allow storage boxes to be slid into and out of the bins. Each bin also has roller wheels 33 and 34 that reduce the friction of such sliding. Note that each bin can hold a number of boxes.

FIG. 4B shows a top view of the storage bins and elevator assembly. The side rails 31 and 32 and roller wheels 33 and 34 are shown for one bin. A track 36 runs across in front of the bins, upon which is mounted an elevator assembly. Under computer control, the elevator assembly 35 moves sideways on the track to reach the appropriate column of bins, and the elevator assembly moves up or down to reach the appropriate row of bins, thus selecting a single bin. Identifying marks, sensors, or electronic tags located on the columns, rows, and/or bins indicate the boundaries of the columns, rows, and bins so that exact positioning can be easily done without high accuracy demands on the electric motors that move the elevator assembly along the track or move the elevator up and down. Each bin may optionally be labeled with a bar code or an electronic tag so as to allow verification of the identity of the bin.

Figure 5A:
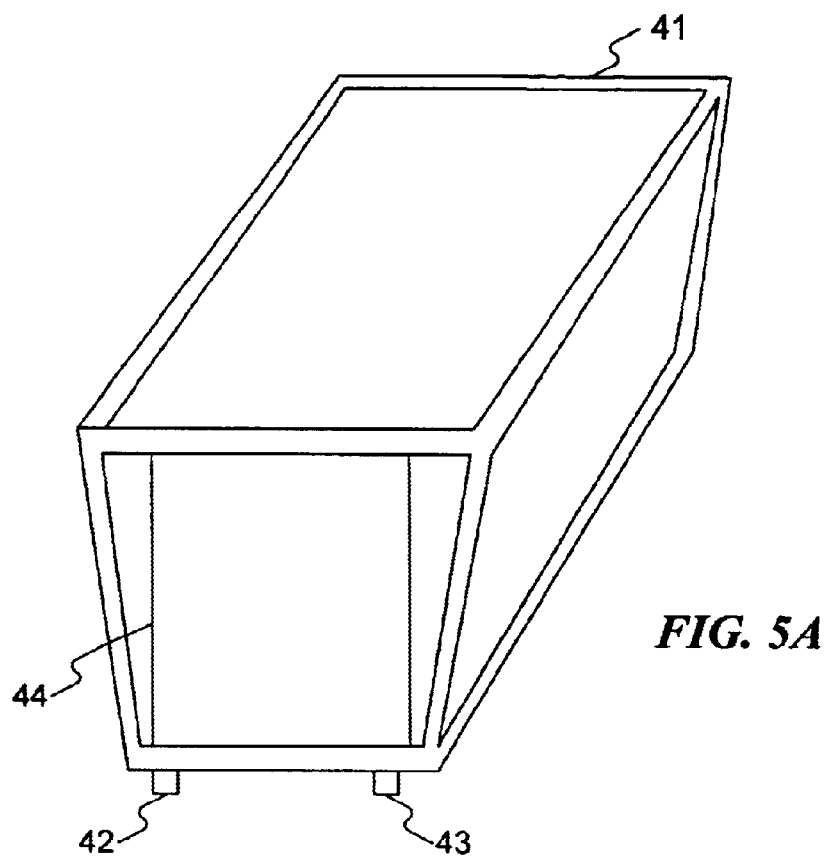
FIGS. 5A and 5B show different perspectives of a storage box.
Figure 5B:
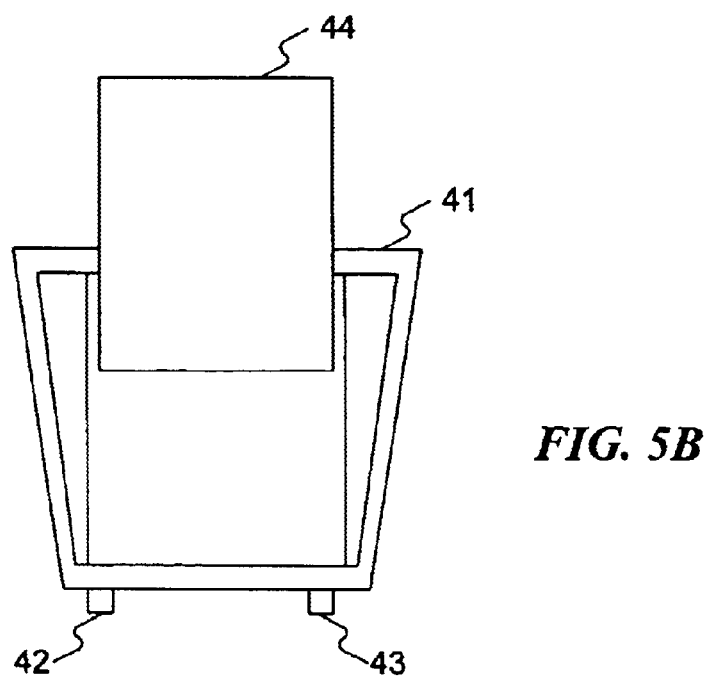

FIGS. 5A and 5B show different perspectives of a storage box.

FIG. 5A shows a front-top-right perspective view of a storage box. The storage box 41 is preferably made of hard plastic, but may also be made of wood, metal, or other material. Solid runners 42 and 43 are attached at the bottom of the box that allow the box to slide easily between the side rails of the bins. The box is wider at the top than at the;bottom, although typically not as much as is shown in the exaggerated drawing. A sliding door 44, which may be made of a rigid material (as shown), or can be made of a flexible material that rolls up, is included as part of one end of the box. FIG. 5A shows the door in the closed position.

FIG. 5B shows a front view of the storage box shown in FIG. 5A. This view also shows the door 44 partially opened. When the storage box 41 is retrieved from the bin and delivered to the delivery window, the door will open completely so as to allow the customer to remove the package containing the desired goods.

Figure 6:
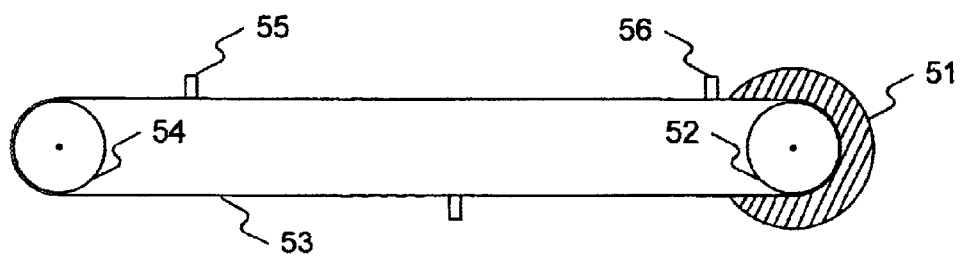
FIG. 6 shows a mechanism for moving the storage boxes to and from the storage bins and to deliver the storage bin and thus package to the customer.

FIG. 6 shows a mechanism for moving the storage boxes to and from the storage bins and to deliver the storage bin and thus package to the customer. An electric motor 51, controlled by the computer controlling the drive-up delivery mechanism, moves, rotating a wheel 52 that is contained in one end of a flexible continuous-loop belt 53, with the other end of the belt having an idler wheel 54 attached to a fixed structure, as is the electric motor and associated wheel. Pushing tabs 55 and 56 are placed at intervals along the belt. When the motor moves, one of the tabs catches one end of a storage box and moves it the desired amount.

Figure 7:
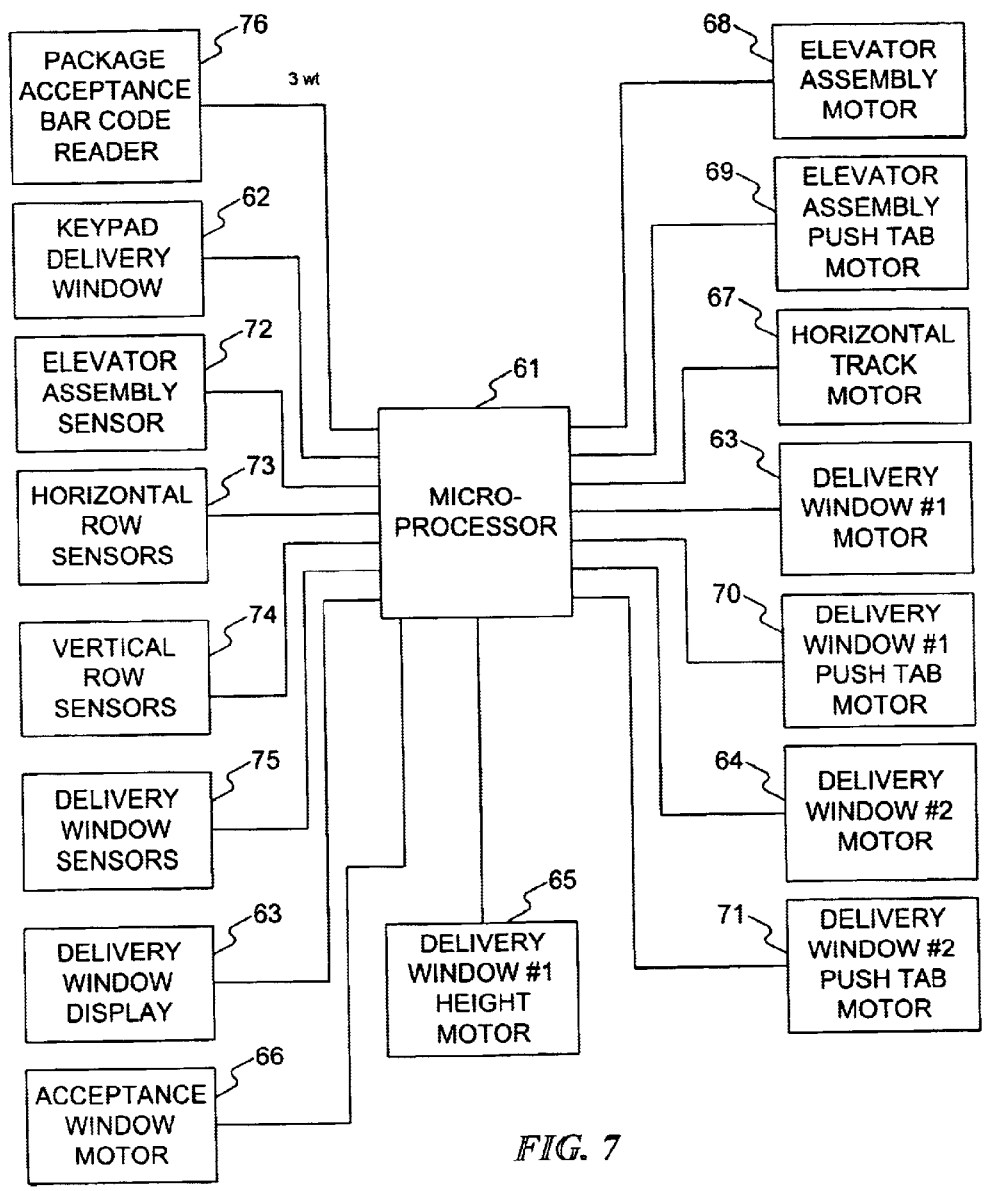
FIG. 7 shows the microprocessor and associated circuitry controlling the drive-up storage container and pickup mechanism that is part of the electronic ordering and delivery system.

FIG. 7 shows the microprocessor and associated circuitry controlling the drive-up storage container and pickup mechanism that is part of the electronic ordering and delivery system. A microprocessor 61 with associated software is connected to the keypad 62 and display 63 and motors 64 and 65 controlling the sliding windows for the two delivery windows and the motor 66 for the acceptance window. The microprocessor is also connected to the electric motors 67 driving the pulley and belt arrangements that move the boxes into and out of the storage bins and delivery windows, and to the electric motors 68 that run the elevator assembly sideways on the horizontal track and the vertical elevator track. The microprocessor also controls the various push tab motors 69, 70, and 71. The microprocessor is also connected to the various sensors such as the elevator assembly sensor 72, horizontal row sensors 73, vertical column sensors 74 and delivery window sensors 75 that monitor movement of the elevator assembly in both its dimensions and to the mechanism that moves the storage boxes into and out of the bins and to the delivery window. The microprocessor is also connected to the bar code reader 76 and/or other identification devices that determine the identity of packages, bins, and, if desired, particular storage boxes.

Figure 8:
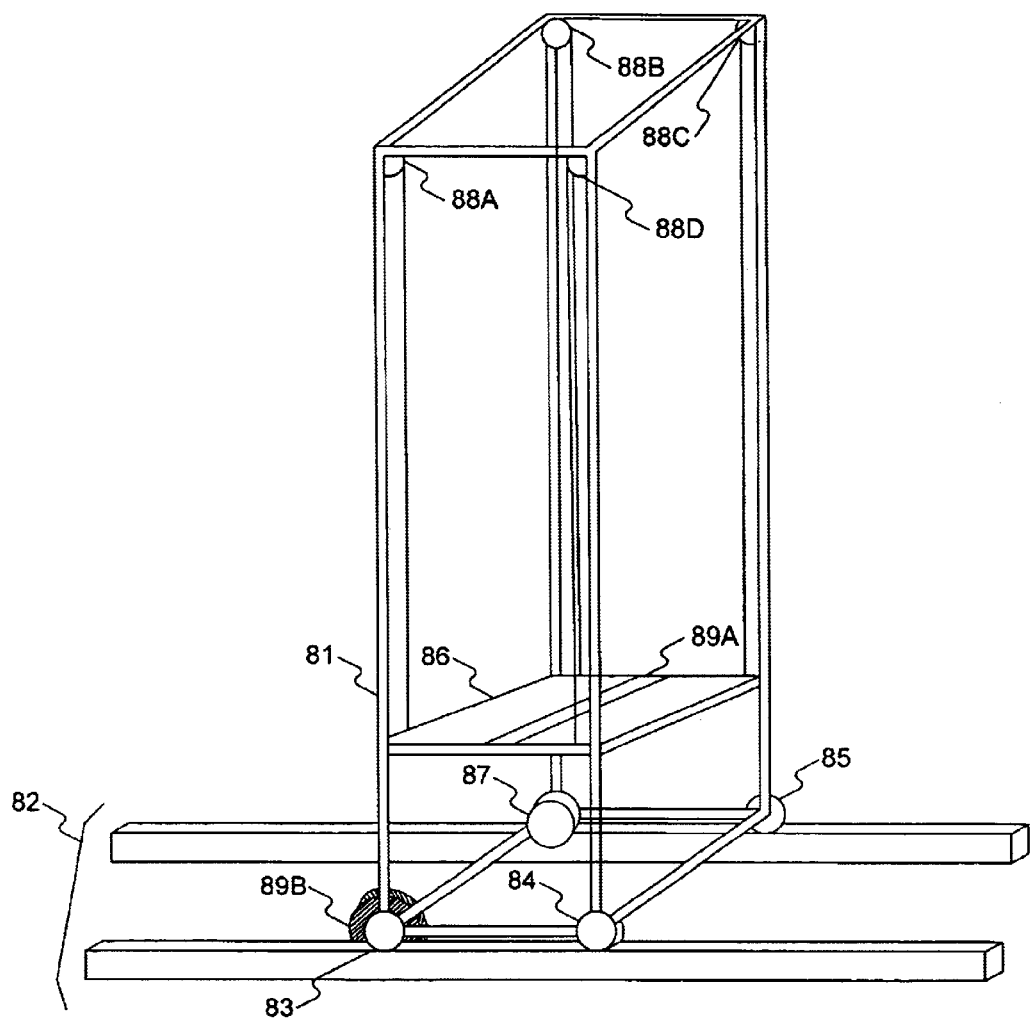
FIG. 8 shows the elevator mechanism that raises up or down to put a storage box into a bin or get a box from a bin.

FIG. 8 shows the elevator mechanism that raises up or down to put a storage box into a bin or get a box from a bin. The elevator assembly 81 consists of a basic open framework that is mounted on a track 82 using wheels 83, 84, and 85 that will allow back and forth movement along a path determined by the track. At least one such wheel is connected to an electric motor 87 to provide a push for the assembly. A flat platform 86 is held within the framework and the platform is moved up and down using an electric motor 89B attached to the movable shelf by wire, chain, or such through pulleys/wheels 88A, 88B, 88C, and 88D on a screw mechanism that will allow the platform to move freely up and down and stop at any point. The platform is equipped with a device to push boxes off the platform. The device consists of some form of continuous belt/chain with "fingers" (i.e., pushing tabs) appropriately spaced to push boxes off the platform, contained in slot 89A.

The individual containers and the location of their storage can be controlled differently according to different requirements of different goods for particular temperature conditions. For example, a given column may be contained in a refrigerated compartment. Similarly, different orders may have associated with them different levels of security, requiring either different levels of physical security that they are stored at, requiring a higher assurance that the person picking up the order is the person with appropriate authority, or both.

Figure 9:
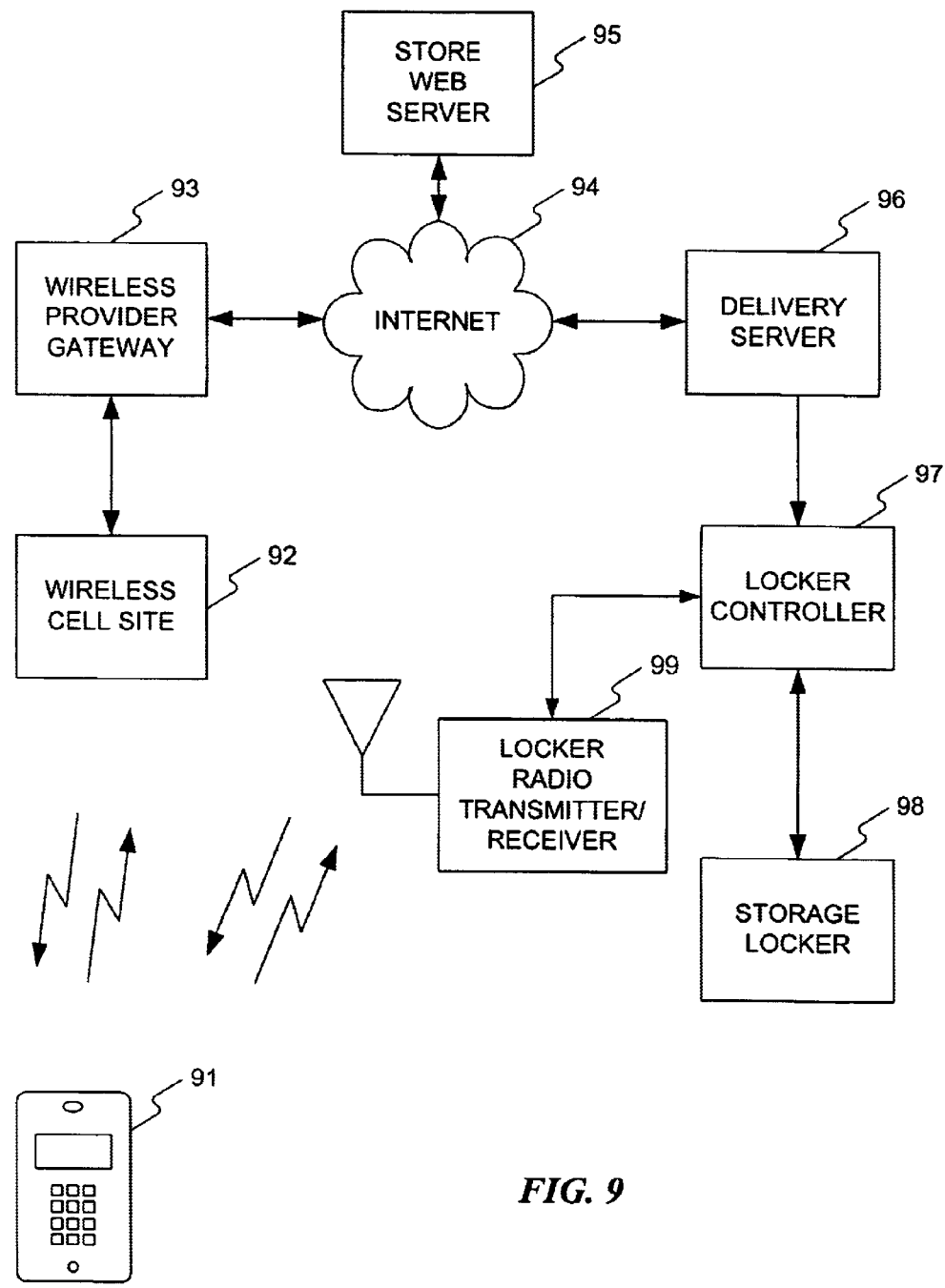
FIG. 9 is a block diagram showing the architecture of the order and delivery system in which the location at which goods is stored is different than the location of the storage locker, and the wireless device communicates directly with a transmitter and receiver at the delivery location.

FIG. 9 is a block diagram showing the architecture of the order and delivery system in which the location at which goods is stored is different than the location of the storage locker, and the wireless device communicates directly with a transmitter and receiver at the delivery location.

Ordering is done by a PC or, particularly, by wireless device 91, which communicates with wireless cell site 92, through wireless provider gateway 93 and the Internet 94 to store web server 95 to arrange the order. Store web server also communicates via the Internet 94 with delivery server 96 and locker controller 97, and user's wireless device 91 can also communicate with locker controller 97 through delivery server 96 if desired. The difference here is that in addition to being able to communicate via normal cell sites to place orders and check status, wireless device 91 also can communicate directly with the locker controller 97 via locker radio transmitter/receiver 99. This allows high resolution location finding without the necessity of GPS capability in the handheld device, thus improving security. Communication is preferably done with a Bluetooth protocol.

We claim:

1. A method for the order and delivery of goods, comprising the steps of:

receiving an order for one or more items via an electronic communications medium;

locating the one or more items;

transporting the one or more items to a locked storage container containing multiple orders;

identifying the order by an individual who appears at the locked storage container;

retrieving the order automatically and presenting it to the individual through a delivery window.

2. The method of claim 1, wherein the order was placed by a device containing a display and input system.

3. The method of claim 1, wherein the order was placed by voice via a telephone communication system.

4. The method of claim 1, wherein the order was placed in person at a retail store.

5. The method of claim 1, further comprising the step of transporting the goods at least part of the way by a regional train system that was designed for passenger use.

6. The method of claim 1, wherein the goods are retrieved from the stock of a retail store and placed into a storage container located on the premises of a retail store.

7. The method of claim 1, wherein the goods are dispensed to an individual who is in a vehicle.

8. The method of claim 1, wherein the goods for a particular order are stored in one or more individual containers, each of which is placed for storage in a bin within a matrix of vertical columns and horizontal rows.

9. The method of claim 1, wherein the identification of the order is carried out by transmitting a signal from a portable device carried by the individual via a wireless communication medium.

10. The method of claim 9, wherein the manner in which the order is delivered is determined under the control of the individual by use of the portable device carried by the individual.

11. The method of claim 9, wherein the height of the delivery window can be adjusted by the individual using the portable device carried by the individual.

12. The method of claim 9, wherein the transmission from the portable device carried by the individual is transmitted by radio through a wireless communications network.

13. The method of claim 9, wherein the portable device allows the placing of the original order.

14. The method of claim 9, wherein the portable device allows modification of the original order.

15. The method of claim 9, wherein the portable device displays information about the status of the order.

16. The method of claim 9, wherein the portable device allows the individual to designate a delivery location if one has not yet been established.

17. The method of claim 9, wherein the portable device allows the individual to change a delivery location.

18. The method of claim 9, wherein the portable device displays directions to the delivery location to the individual.

19. The method of claim 9, wherein the signal transmitted from the portable device carried by the individual is transmitted to a receiver which is at the same physical location as the storage container.

20. An apparatus for the order and delivery of goods, comprising:

an electronic device for placing orders;

a locked storage container containing multiple orders;

a mechanism for communicating with an individual who appears at the locked storage container and identifies a particular order;

an automated system that retrieves the goods associated with the order requested by the individual and presents the goods to the individual through a delivery window.

* * * * *